Dec. 11, 1934.  H. McGILL  1,983,916
VARIABLE SPEED POWER TRANSMISSION MECHANISM
Filed Oct. 10, 1933   2 Sheets-Sheet 1

Inventor:
Henry McGill
By
Attorney

Patented Dec. 11, 1934

1,983,916

UNITED STATES PATENT OFFICE 1,983,916

VARIABLE SPEED POWER TRANSMISSION MECHANISM

Henry McGill, Canterbury, Melbourne, Victoria, Australia

Application October 10, 1933, Serial No. 693,032 In Australia May 27, 1933

11 Claims. (Cl. 74—260)

This invention relates to variable speed power transmission mechanism wherein centrifugal force arising from one or more weights or weighted members revolving with a driving member is utilized to govern the speed ratio between driving and driven members.

The primary object of the invention is to provide a simple and efficient mechanism of the kind indicated in which suitable ratios will be automatically adjusted by the mechanism in accordance with variations in the speed or power of the driving member or in the load or torque resistance of the driven member.

The improved mechanism is particularly suitable for power transmission purposes in internal combustion engined vehicles and in such instances eliminates the usual flywheel, clutch and change speed mechanism, and thus makes for extreme simplicity in construction and in control.

According to the invention I provide variable speed power transmission mechanism of the planetary gear type characterised in that centrifugal force arising from one or more masses revolving with the planet pinion carrier or driving member is caused to act upon the planet pinions in such manner as to continuously oppose forward rotation or rolling of the planet pinions around the sun pinion or driven member.

In its preferred form the invention includes a rotary driving member carrying one or more planet pinions which mesh with a sun pinion constituting the driven member, the load or torque resistance of which tends to rotate each planet pinion in what may be termed a forward direction such as would cause it to roll idly around the sun pinion. Such rotation of each planet pinion is resisted and partially or wholly overcome by the force exerted by a number of weights or weighted members having a driving connection with the planet pinion and constrained to move, due to centrifugal force arising from the rotation of the driving member, along a path which is eccentric to the planet pinion. The speed ratio between the driving and driven members is thus determined by the extent to which the force of the centrifugally influenced weights or weighted members overcomes rotation of the planet pinion in a forward direction, the speed ratio becoming 1:1 in the event of rotation of the planet pinion being prevented.

In order that maximum resistance to forward rotation of each planet pinion will be offered at any given speed of the driving member, the path for the weights should have its eccentricity or throw relative to the planet pinion extending substantially tangentially to the orbit of the planet pinion and in the direction of rotation of the driving member.

Referring to the drawings which form part of this specification:—

Figure 1:
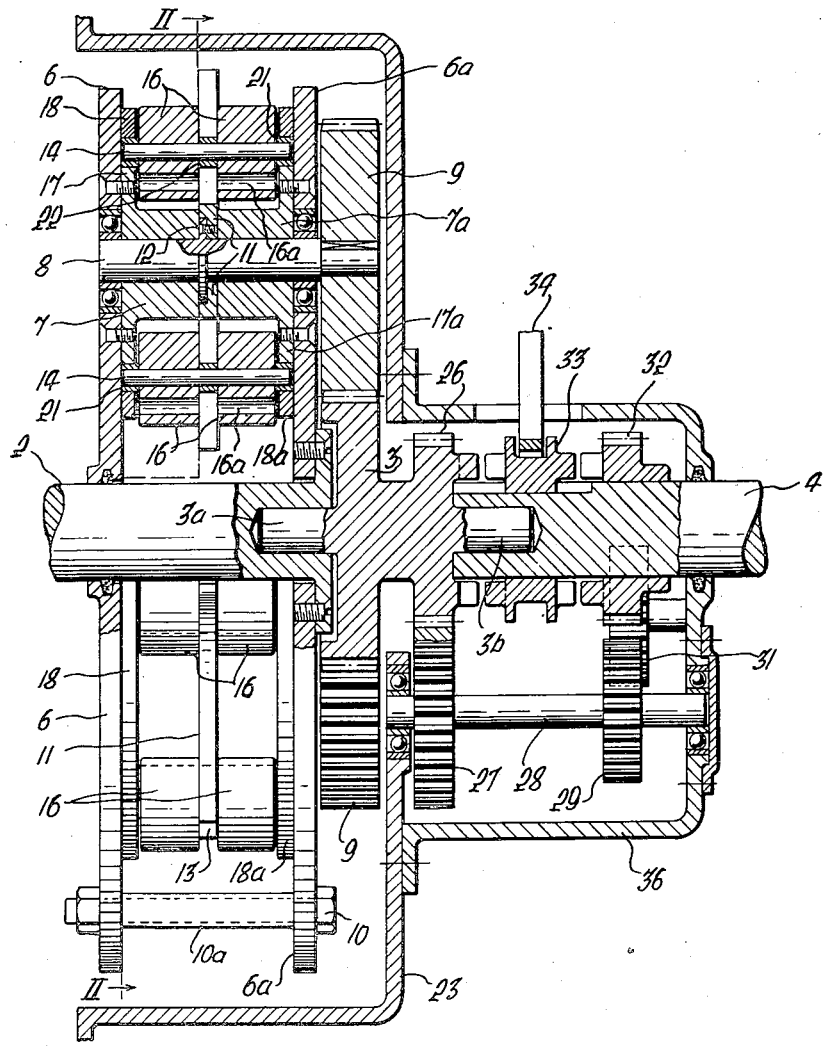
Figure 1 is a sectional elevation of mechanism according to a preferred embodiment of the invention suitable for variable speed power transmission in internal combustion engined vehicles.

In the drawings the numeral 2 indicates a driving shaft which may be constituted by or direct coupled to, the crank shaft of an internal combustion engine. The numeral 3 indicates a driven member in the form of a sun pinion, co-axial with the driving shaft, adapted to be coupled by suitable reversing gear to a tail shaft 4.

The driving shaft may have secured thereto a planet wheel carrier comprising two longitudinally spaced discs 6, 6a, between which is secured a number of pairs of circumferentially spaced bearing members 7, 7a, accommodating the spindles 8 of a number of planet pinions 9 meshing with the sun pinion. The discs may be held in spaced relationship by bolts 10 and distance pieces 10a.

Extending between the pairs of bearing members is a weight carrier or spider 11 secured as at 12 to the respective planet wheel spindle and provided with a number of preferably radial slots 13 through each of which extends a rod 14 supporting weights 16 at opposite sides of the spider. The rods 14 and spider 11 provide a driving connection between the weights 16 and the respective planet pinion.

The weights are adapted to move along a path which is eccentric to the respective planet pinion. This path is preferably circular, but may be somewhat elliptical or of other suitable form so long as it is eccentric to the planet pinion to an extent which will ensure that at all positions of the spider the centrifugal force of the weight or weights at one side of the planet wheel spindle tending to rotate it in the reverse direction, will act upon the spindle with greater leverage than the centrifugal force of the weight or weights at the opposite side of the spindle. For this purpose the bearing members 7, 7a may be eccentric to the spindles 8 or may have at their outer ends flanges 17, 17a the outer peripheries of which are suitably eccentric to the planet pinion. The flanges may be encircled by loose or floating rings 18, 18a, forming between their inner diameters and the outer peripheries of the flanges 17, 17a, a guide path or track 19 for the end portions of the weight supporting rods 14. The weights 16 are preferably freely rotatable upon the rods 14 and may be unbalanced with regard thereto, as by providing each weight with a hole or recess 16a.

For the purpose of minimising friction the rods 14 may be fitted at their ends with rollers 21 conforming in diameter to the width of track 19, and at their intermediate points with rollers 22 conforming in diameter to the width of the slots 13 of the spider 11.

Figure 2:
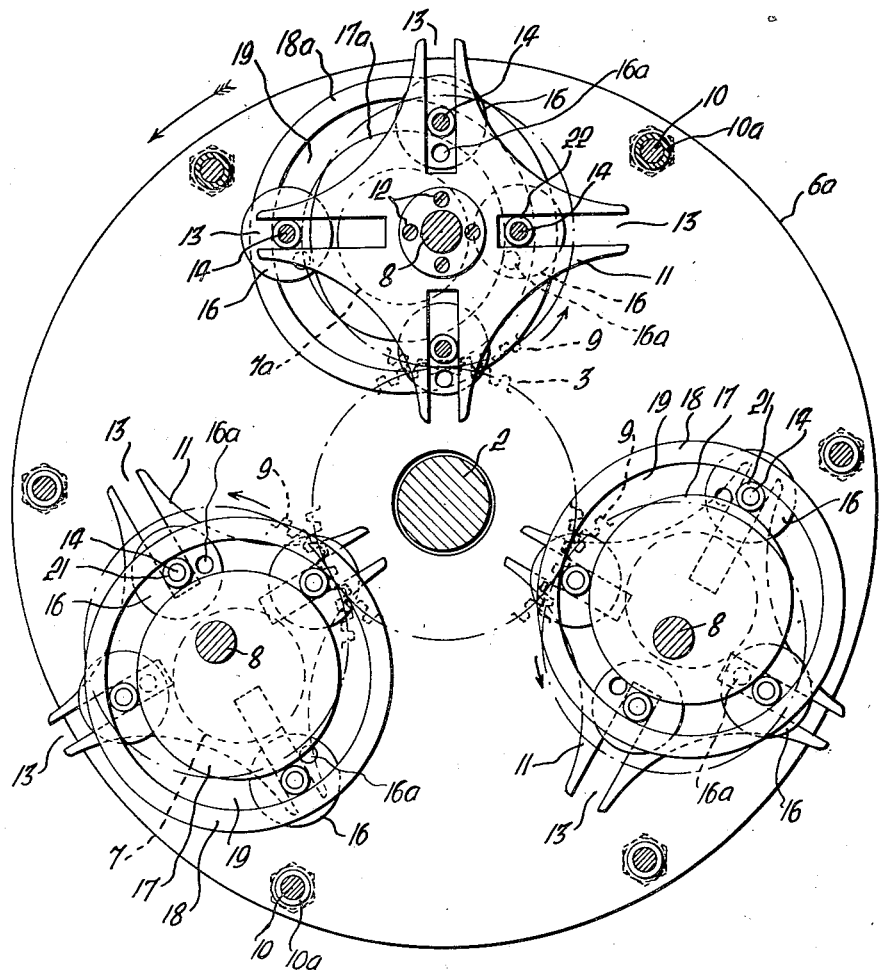
Figure 2 is a cross section taken approximately on the line II—II in Figure 1.

As will be seen from Figure 2 the eccentricity of the weight paths in relation to the planet pinions extends substantially tangential to the orbit of the planet pinions and in the direction of rotation of the driving member.

Assuming that the driving member is rotating in the direction indicated by the arrow in Figure 2 then the load on the driven member tends to rotate the planet pinions in a forward direction as indicated which would cause the pinions to roll around the sun pinion. Such rotation or rolling of the planet pinions is resisted by the power exerted by the centrifugally influenced weights which, through their driving connections with the planet pinions, tend to turn them in the opposite or rearward direction. The extent to which the forward rotation of the pinions is resisted by the centrifugally influenced weights determines the speed ratio between the driving and driven members. Thus for a constant engine speed, the speed of the driven member will vary inversely as the load thereon.

It will be evident that in the event of the planet pinions being prevented from rotation the mechanism will provide a 1:1 ratio, and that if the pinions are rotated in the reverse direction the driven member will be rotated at higher speed than the driving member.

In applying the invention to internal combustion engined vehicles the assemblage may be disposed within the usual flywheel casing or an oil tight casing 23 attached to the rear of the engine block, and reversible clutching means of any conventional or suitable form may be provided for coupling the sun pinion to the tail shaft 4 so that the latter may be driven in either direction. Accordingly, the sun pinion may have spigot portions 3a, 3b journalled respectively in the driving shaft 2 and the tail shaft. A forward pinion 26 may be formed integral with the sun pinion, and mesh with first pinion 27 on lay shaft 28 which also carries a second pinion 29 meshing with an idle pinion 31 which meshes with reverse pinion 32 on the tail shaft. A clutch member 33 axially slidable along the shaft 4 by means of a control lever 34 may be provided to clutch either pinion 26 or pinion 32 to the tail shaft. The reversible clutch gear may be located within a casing 36 attached to casing 23.

It will be evident that infinitely variable speed ratios are obtainable in forward and reverse and that the mechanism enables the vehicle to overrun the engine when the momentum of the vehicle exceeds the power developed by the engine.

Having now described my invention what I claim as new and desire to secure by Letters Patent is:—

1. Variable speed power transmission mechanism, comprising a rotary driving member, a driven member in the form of a sun pinion, one or more planet pinions revolvable with the driving member and meshing with the sun pinion so that the load or torque resistance of the latter tends to rotate each planet pinion in a forward direction as would cause it to roll around the sun pinion, and a plurality of masses revolving with the driving member and adapted to move along a path which is eccentric to the respective planet pinions, the eccentricity of this weight path extending substantially tangentially to the orbit of the planet pinions and in the direction of rotation of the driving member, said masses being connected to the planet pinions so that the resulting centrifugal force continuously opposes forward rotation or rolling of the planet pinions around the sun pinion.

2. Variable speed power transmission mechanism, comprising a rotary driving member, a driven member in the form of a sun pinion, one or more planet pinions carried by the driving member and meshing with the sun pinion so that the load or torque resistance of the latter tends to rotate each planet pinion in a forward direction as would cause it to roll around the sun pinion and a number of weights or weighted members having a driving connection with each planet pinion and constrained to move, due to centrifugal force arising from the rotation of the driving member, along a path which is eccentric to the planet pinion, the eccentricty of this weight path extending substantially tangentially to the orbit of the planet pinions and in the direction of rotation of the driving member, whereby rotation of the planet pinion in a forward direction is partially or wholly overcome.

3. Variable speed power transmission mechanism comprising a rotary driving member, a driven member in the form of a sun pinion, one or more planet pinions carried by the driving member and meshing with said sun pinion, a weight carrier for each planet pinion having a driving connection therewith, weights retained to said carrier, and guide means providing a path for said weights which is eccentric to the planet pinion, the eccentricity of this weight path extending substantially tangentially to the orbit of the planet pinions and in the direction of rotation of the driving member, substantially as described.

4. Variable speed power transmission mechanism according to claim 3 wherein the weights are supported by members having a driving connection with said weight carrier and co-operating with said guide means.

5. Variable speed power transmission mechanism according to claim 3 wherein said weights are supported by rods outstanding from said weight carrier and adapted to project into the path provided by said guide means.

6. Variable speed power transmission mechanism comprising a rotary driving member, a driven member in the form of a sun pinion, one or more planet pinions carried by said driving member and meshing with said sun ponion, a weight carrier secured to each planet pinion, a series of weights retained to said carrier at circumferentially spaced positions with ability to move substantially radially thereof, and guide means defining a circular path for said weights which is eccentric to said planet pinion, the eccentricity of this weight path extending substantially tangentially to the orbit of the planet pinions and in the direction of rotation of the driving member.

7. Variable speed power transmission mechanism according to claim 6 wherein said guide means comprises an inner circular member fast with the driving member, and an outer floating ring spaced outwardly from the inner circular member.

8. Variable speed power transmission mechanism comprising a rotary driving member, a driven member in the form of a sun pinion, a bearing carried by said driving member, a planet pinion having its spindle accommodated in said bearing, a plate with substantially radial slots secured to said spindle, weight supporting members extending through said slots, weights on said supporting members, and guide means associated with said weight supporting members defining a path which is eccentric to said planet pinion, the eccentricity of this weight path extending substantially tangentially to the orbit of the planet pinions and in the direction of rotation of the driving member.

9. Variable speed power transmission mechanism according to claim 8 wherein said guide means comprises a circular face on said bearing member and a floating ring spaced outwardly therefrom, end portions of said weight supporting members projecting into the path defined by said guide means.

10. Variable speed power transmission mechanism comprising a driving member including a disc, planet pinions rotatably supported by said disc, a driven member in the form of a sun pinion enmeshed by said planet pinions, a weight carrier for each planet pinion having a driving connection therewith, a series of weights on each carrier, and guide means on said disc for causing said weights to move in an eccentric path relative to said planet pinions, the eccentricity of this weight path extending substantially tangentially to the orbit of the planet pinions and in the direction of rotation of the driving member.

11. Variable speed power transmission mechanism comprising a driving member including two discs spaced apart, bearings carried by and extending between said discs, planet pinions having spindles supported respectively by said bearings, a weight carrier for each pinion secured to the spindle thereof between the discs, a series of weights connected to each carrier, guide means located between said discs adapted to cause said weights to follow a path eccentric to said planet pinions, the eccentricity of this weight path extending substantially tangentially to the orbit of the planet pinions and in the direction of rotation of the driving member.

HENRY McGILL.